US012749671B2

(12) United States Patent
Kwak et al.

(10) Patent No.: US 12,749,671 B2
(45) Date of Patent: Sep. 29, 2026

(54) ELECTRODE FOR ELECTROCHEMICAL DEVICE COMPRISING DRY ELECTRODE FILM AND METHOD FOR MANUFACTURING THE SAME

(71) Applicant: LG Energy Solution, Ltd., Seoul (KR)

(72) Inventors: Sang-Min Kwak, Daejeon (KR); Koo-Seung Chung, Daejeon (KR); Nam-Jeong Lee, Daejeon (KR); Ho-Chan Lee, Daejeon (KR); Dong-Oh Shin, Daejeon (KR); Kwang-Ho Yoo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 868 days.

(21) Appl. No.: 17/957,167

(22) Filed: Sep. 30, 2022

(65) Prior Publication Data

US 2023/0099713 A1 Mar. 30, 2023

(30) Foreign Application Priority Data

Aug. 17, 2021 (KR) ........................ 10-2021-0108354
Aug. 17, 2022 (KR) ........................ 10-2022-0102936

(51) Int. Cl.
*H01M 4/04* (2006.01)
*H01M 4/62* (2006.01)
*H01M 4/02* (2006.01)

(52) U.S. Cl.
CPC ....... *H01M 4/0435* (2013.01); *H01M 4/0404* (2013.01); *H01M 4/623* (2013.01); *H01M 2004/021* (2013.01)

(58) Field of Classification Search
CPC .... H01M 4/04; H01M 4/0404; H01M 4/0435; H01M 4/623
See application file for complete search history.

(56) References Cited

U.S. PATENT DOCUMENTS 6,120,938 A * 9/2000 Atsumi ............... H01M 10/052 429/231.1
11,355,821 B2 6/2022 Lee et al.
2015/0303481 A1* 10/2015 Duong .................. H01M 4/622 241/5
2018/0277825 A1 9/2018 Aizawa
(Continued)

FOREIGN PATENT DOCUMENTS

JP 2018160440 A 10/2018
KR 100868256 B1 11/2008
(Continued)

*Primary Examiner* — Kenneth J Douyette
(74) *Attorney, Agent, or Firm* — Lerner David LLP

(57) ABSTRACT

Disclosed is a method for manufacturing a dry electrode. In the method, a conductive primer layer and an insulating protective layer are formed in a single step, or the insulating protective layer is formed first before an electrode active material layer is formed and after the conductive primer layer is formed. In this manner, there is no gap between the insulating protective layer and the conductive primer layer, thereby providing further improved insulation property. In addition, since the dry electrode is manufactured by laminating the current collector having the conductive primer layer and the insulating protective layer with the dry electrode film, an electrode having excellent adhesion and improved stability can be obtained advantageously.

15 Claims, 6 Drawing Sheets

(56) References Cited

U.S. PATENT DOCUMENTS

| | | | |
|---|---|---|---|
| 2021/0098770 | A1 | 4/2021 | Yudi et al. |
| 2021/0344014 | A1 | 11/2021 | Park et al. |

FOREIGN PATENT DOCUMENTS

| | | | |
|---|---|---|---|
| KR | 20200017218 | A | 2/2020 |
| KR | 20200017821 | A | 2/2020 |
| KR | 102155029 | B1 | 9/2020 |
| KR | 20210006899 | A | 1/2021 |

* cited by examiner

ELECTRODE FOR ELECTROCHEMICAL DEVICE COMPRISING DRY ELECTRODE FILM AND METHOD FOR MANUFACTURING THE SAME

CROSS-REFERENCE TO RELATED APPLICATIONS

The present application claims priority to Korean Patent Application No. 10-2021-0108354 filed on Aug. 17, 2021 and Korean Patent Application No. 10-2022-0102936 filed on Aug. 17, 2022 in the Republic of Korea, the disclosures of which are incorporated herein by reference.

TECHNICAL FIELD

The present disclosure relates to an electrode for an electrochemical device having improved insulation property and a method for manufacturing the same. The electrode includes a free-standing type dry electrode film as an electrode active material layer.

BACKGROUND ART

Due to a rapid increase in use of fossil fuel, there has been an increasing need for use of substitute energy and clean energy. The most actively studied field as a part of attempts to meet such a need is the field of power generation and power storage using electrochemistry. Currently, typical examples of electrochemical devices using electrochemical energy include secondary batteries, and application thereof has been extended gradually. A lithium secondary battery as a representative of such secondary batteries has been used not only as an energy source of mobile instruments but also as a power source of electric vehicles and hybrid electric vehicles capable of substituting for vehicles, such as gasoline vehicles and diesel vehicles, using fossil fuel and regarded as one of the main causes of air pollution, recently. In addition, application of such a lithium secondary battery has been extended even to a supplementary power source of electric power through the formation into a grid. A process of manufacturing such a lithium secondary battery is broadly divided into an electrode-forming step, an electrode assembly-forming step and an aging step. The electrode-forming step is further divided into an electrode mixture-mixing step, an electrode-coating step, a drying step, a pressing step, a slitting step, a winding step, or the like. Among the steps, the electrode mixture-mixing step is a step of mixing the ingredients for forming an electrode active layer configured to carry out electrochemical reactions actually in the electrode. Particularly, an electrode active material as an essential element of the electrode is mixed with a binder used for the binding of powder particles among themselves and the adhesion to a current collector, a solvent for imparting viscosity and dispersing a powder, or the like, to prepare a slurry having flowability.

Such a composition mixed for forming an electrode active layer is also called an electrode mixture in a broad sense. Then, an electrode-coating step of applying the electrode mixture onto a current collector having electrical conductivity and a drying step of removing the solvent contained in the electrode mixture are carried out, and then the resultant electrode is pressed to a predetermined thickness.

Meanwhile, as the solvent contained in the electrode mixture evaporates during the drying step, defects, such as pinholes or cracks, may be generated in the preliminarily formed electrode active layer. In addition, the active layer is not dried uniformly at the internal part and external part thereof, and thus a powder floating phenomenon may occur due to a difference in solvent evaporation rate. In other words, a powder present in a portion dried earlier may float, while forming a gap from a portion dried relatively later, resulting in degradation of electrode quality.

In addition, when manufacturing an electrode through such a slurry coating process, the slurry may flow down before the slurry is completely dried, and thus the shape of the electrode may not perfectly coincide with the originally designed shape. Particularly, such a phenomenon appears significantly at the edge of the electrode end portion. In other words, the slurry may flow down to form an incline, not right angle, at the edge of the electrode end portion, or the slurry may flow down beyond the originally designed coating portion boundary line to form a coating surface at a portion to be retained as a non-coated portion. Meanwhile, an insulation portion may be disposed in order to improve the insulation property of an electrode. When a step of coating an insulation portion is carried out at the non-coated portion after forming an electrode active material layer in a method for manufacturing an electrode through a slurry coating process, the insulation portion coating may be overlapped with the incline. When an electrode is manufactured through an electrode slurry coating process, an incline is formed at the end portion of the electrode active material layer. When the insulation layer is coated on the electrode provided with the electrode active material layer having such an incline, the incline of the electrode active material layer is overlapped with the insulation layer. Therefore, additional process management is required in order to minimize such an overlapped width.

Therefore, to solve the above-mentioned problems, there has been considered a drying apparatus which allows uniform drying of the internal and external parts of an active layer and can control the evaporation rate of a solvent. However, such drying apparatuses are highly expensive and require a lot of costs and times for their operation, and thus are disadvantageous in terms of manufacture processability. Therefore, recently, active studies have been conducted to manufacture a dry electrode without using any solvent.

In general, the dry electrode is obtained by laminating a free-standing type electrode film, including an active material, a binder and a conductive material and prepared in the form of a film, onto a current collector. First, an active material, a carbonaceous material as a conductive material and a binder capable of fibrilization are mixed by using a blender, the binder is fibrilized by imparting shear force thereto through a process, such as jet milling or kneading, and then the resultant mixture is subjected to calendering to form a film shape, thereby providing a free-standing film. After that, the free-standing type electrode film obtained after the calendering is laminated on the current collector to obtain a dry electrode.

When the insulation layer is disposed after the electrode active material layer is disposed on the current collector in such a method for manufacturing a dry electrode, it is difficult to dispose the electrode active material layer and the insulation layer with no gap therebetween. Particularly, when a conductive primer layer is formed between the electrode active material layer and the current collector, processing steps may be increased. In addition, in the case of an electrode obtained through a dry process, particularly, an electrode obtained by using a free-standing type dry electrode film, the dry electrode film is laminated with the current collector after slitting, and thus no incline is generated at the end portion of the electrode, or even if an incline is formed, the inclination angle may be large and the inclination length may be minimized. The accompanying drawing is a schematic view illustrating an embodiment of a dry electrode film. Referring to the drawing, the dry electrode film 20 has an inclination of about 90° at the lateral surface, and thus little inclination is formed at the lateral surface. Therefore, when the insulation layer is coated after the electrode active material layer is disposed, and the insulation coating is overlapped with the electrode active material layer, a protrusion is formed at the end portion of the electrode. For this, some problems, such as winding defects, may be generated as compared to the electrode obtained through a slurry coating process. Under these circumstance, there is a need for a novel method for manufacturing a dry electrode including a dry electrode film which provides improved processing efficiency and processing convenience.

DISCLOSURE

Technical Problem

The present disclosure is designed to solve the problems of the related art, and therefore the present disclosure is directed to providing a method for manufacturing a dry electrode including an insulating protective layer disposed therein, which provides improved processing efficiency and processing convenience. The present disclosure is also directed to providing a dry electrode for an electrochemical device, obtained by the method and having improved insulation property.

Technical Solution

According to the first embodiment of the present disclosure, there is provided a method for manufacturing an electrode for an electrochemical device, including the steps of:

(S100) preparing an electrode member which includes a coating layer disposed on the surface of an electrode current collector and including a conductive primer layer and an insulating protective layer; and (S200) disposing a free-standing type dry electrode film on the top surface of the conductive primer layer and carrying out lamination, wherein the insulating protective layer is disposed in the conductive primer layer in such a manner that the lateral surface of the conductive primer layer may not be exposed by virtue of the insulating protective layer, and the dry electrode film is disposed on the top of the conductive primer layer.

According to the second embodiment of the present disclosure, there is provided the method for manufacturing an electrode for an electrochemical device as defined in the first embodiment, wherein the coating layer is disposed on both surfaces or at least one surface of the current collector, and the coating layer is disposed in such a manner that the coating layer may totally or at least partially cover the surface on which the coating layer is disposed.

According to the third embodiment of the present disclosure, there is provided the method for manufacturing an electrode for an electrochemical device as defined in the first or the second embodiment, wherein the conductive primer layer and the insulating protective layer are formed to the same height, or the insulating protective layer has a larger height.

According to the fourth embodiment of the present disclosure, there is provided the method for manufacturing an electrode for an electrochemical device as defined in any one of the first to the third embodiments, wherein the conductive primer layer includes a second conductive material and a second binder resin.

According to the fifth embodiment of the present disclosure, there is provided the method for manufacturing an electrode for an electrochemical device as defined in any one of the first to the fourth embodiments, wherein the insulating protective layer includes a third binder resin and inorganic particles.

According to the sixth embodiment of the present disclosure, there is provided the method for manufacturing an electrode for an electrochemical device as defined in the fifth embodiment, wherein the third binder resin and the inorganic particles are present at a ratio of 10:90-40:60.

According to the seventh embodiment of the present disclosure, there is provided the method for manufacturing an electrode for an electrochemical device as defined in any one of the first to the sixth embodiments, wherein the conductive primer layer and the insulating protective layer are disposed in such a manner that their lateral surfaces may be in contact with each other with no gap.

According to the eighth embodiment of the present disclosure, there is provided the method for manufacturing an electrode for an electrochemical device as defined in any one of the first to the seventh embodiments, wherein the free-standing type dry electrode film is formed by calendering an electrode powder including an electrode active material, a first conductive material and a first binder resin to form a strip- or sheet-like shape having a predetermined thickness.

According to the ninth embodiment of the present disclosure, there is provided the method for manufacturing an electrode for an electrochemical device as defined in the eighth embodiment, wherein the electrode powder is obtained by a method for preparing a powder for a dry electrode film, including the steps of:

(a) a first step of preparing a powdery mixture including an electrode active material, a first conductive material and a first binder resin;

(b) a second step of kneading the powdery mixture at 70-200° C. to prepare mixture lumps; and (c) a third step of pulverizing the mixture lumps.

According to the tenth embodiment of the present disclosure, there is provided the method for manufacturing an electrode for an electrochemical device as defined in the ninth embodiment, wherein the electrode powder is heated to a predetermined temperature, before it is introduced to a calendering step.

According to the eleventh embodiment of the present disclosure, there is provided the method for manufacturing an electrode for an electrochemical device as defined in the eighth embodiment, wherein the first binder resin includes polytetrafluoroethylene (PTFE), polyolefin or a mixture thereof.

According to the twelfth embodiment of the present disclosure, there is provided an electrode for an electrochemical device, which is obtained by the method as defined in any one of the first to the eleventh embodiments, and includes an electrode current collector, a conductive primer layer, an insulating protective layer and an electrode active material layer, wherein the conductive primer layer is disposed in such a manner that it may have a predetermined thickness at least partially on both surfaces or one surface of the electrode current collector, and the insulating protective layer is disposed totally or at least partially in the outer circumference of the lateral surface of the conductive primer layer, the electrode active material layer includes a free-standing type dry electrode film, the electrode active material layer is disposed on the top of the conductive primer layer, and the insulating protective layer is disposed in the conductive primer layer in such a manner that the lateral surface of the conductive primer layer may not be exposed by virtue of the insulating protective layer.

According to thirteenth embodiment of the present disclosure, there is provided the electrode for an electrochemical device as defined in the twelfth embodiment, wherein the free-standing type dry electrode film is formed by calendering an electrode powder including an electrode active material, a first conductive material and a first binder resin to form a strip- or sheet-like shape having a predetermined thickness.

According to the fourteenth embodiment of the present disclosure, there is provided a secondary battery which includes the electrode for an electrochemical device as defined in the twelfth or the thirteenth embodiment, wherein the electrode is a positive electrode, and an electrode assembly including the positive electrode, a negative electrode and a separator is received in a battery casing together with a lithium-containing non-aqueous electrolyte.

According to the fifteenth embodiment of the present disclosure, there is provided an energy storage system which includes the secondary battery as defined in the fourteenth embodiment as a unit cell.

Advantageous Effects

In the method for manufacturing a dry electrode according to the present disclosure, a conductive primer layer and an insulating protective layer are formed in a single step, or the insulating protective layer is formed first, before an electrode active material layer is formed and after the conductive primer layer is formed. In this manner, there is no gap between the insulating protective layer and the conductive primer layer, thereby providing further improved insulation property.

In addition, since the dry electrode is manufactured by laminating the current collector having the conductive primer layer and the insulating protective layer with the dry electrode film, an electrode having excellent adhesion and improved stability can be obtained advantageously.

Further, since the electrode active material layer is disposed after the insulating protective layer is already disposed, there is no need for carrying out a step for introducing an additional electrode element (insulating protective layer, etc.) after the electrode active material layer is disposed, and thus it is less likely that the electrode active material layer is damaged during the electrode manufacturing process or the shape stability is degraded. In addition, the conductive primer layer and the insulating protective layer may be formed in a single step, or the formation of the conductive primer layer and the formation of the insulating protective layer may be performed sequentially to provide improved processing convenience and efficiency.

BEST MODE

Hereinafter, preferred embodiments of the present disclosure will be described in detail with reference to the accompanying drawings.

Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The terminology used herein is for the purpose of describing particular embodiments only and is not intended to be limiting of the present disclosure. As used herein, the singular forms 'a', 'an' and 'the' are intended to include the plural forms as well, unless the context clearly indicates otherwise.

Throughout the specification, the expression 'a part includes an element' does not preclude the presence of any additional elements but means that the part may further include the other elements.

It is apparent to those skilled in the art that the terms showing directions such as 'top', 'bottom', 'left', 'right', 'front', 'rear', 'inside' and 'outside' are used for the convenience of explanation and may vary depending on the location of the reference object or the location of the observer.

The present disclosure relates to a method for manufacturing an electrode including a free-standing type dry electrode film and an electrode for an electrochemical device obtained by the method. The electrochemical device includes any device which carries out electrochemical reaction, and particular examples thereof include all types of primary batteries, secondary batteries, fuel cells, solar cells or capacitors, such as super capacitor devices. Particularly, the secondary batteries may be exemplified by lithium-ion secondary batteries in which lithium ions function as ion conductors.

According to the present disclosure, the free-standing type dry electrode film includes an electrode active material, a binder resin and a conductive material. According to an embodiment, the dry electrode film is formed by hot pressing of an electrode powder including at least one of the electrode active material, the binder resin and the conductive material, may have a sheet- or strip-like shape, and has a predetermined level of porosity. Meanwhile, the free-standing type dry electrode film is prepared preferably through a dry manufacturing process using no dispersion medium, such as a solvent, for dispersing the electrode-forming ingredients, such as an electrode active material, contained in the electrode.

Figure 1:
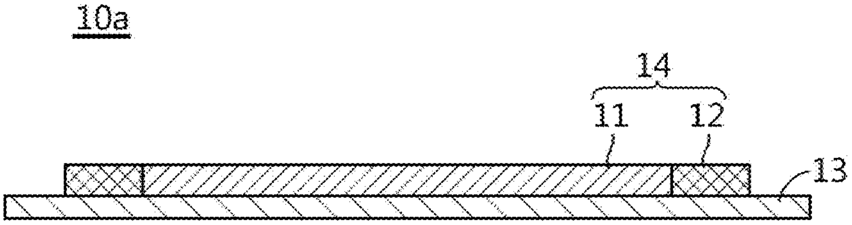
FIG. 1 is a schematic view illustrating the section of the electrode member according to an embodiment of the present disclosure.
Figure 2A:
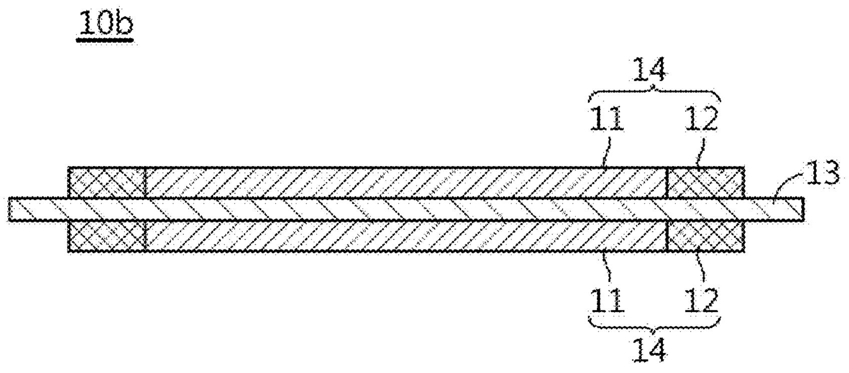
FIG. 2*a* is a schematic view illustrating the section of the electrode member according to an embodiment of the present disclosure, wherein an insulating protective layer and a conductive primer layer are disposed on both surfaces of a current collector.
Figure 2B:
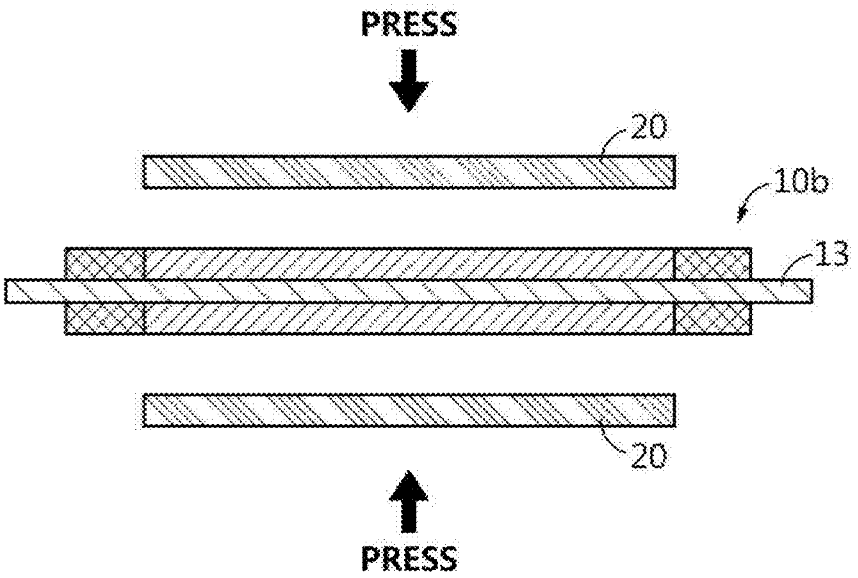
FIG. 2*b* is a schematic view illustrating the process for manufacturing a dry electrode according to an embodiment of the present disclosure, wherein a dry electrode film is disposed on the surface of the conductive primer layer of an electrode member and then is introduced to a lamination process.
Figure 2C:
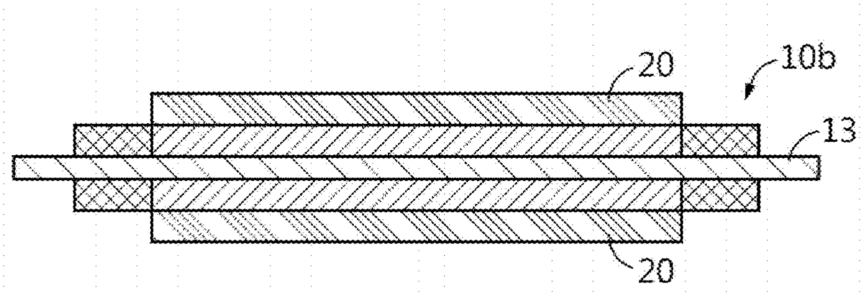
FIG. 2*c* is a schematic view illustrating the section of the dry electrode according to an embodiment of the present disclosure.

FIG. 1 is a schematic view illustrating the section of the electrode member according to an embodiment of the present disclosure. In addition, FIG. 2*a* to FIG. 2*c* are schematic views illustrating the method for manufacturing an electrode according to an embodiment of the present disclosure in the order of process. Hereinafter, the present disclosure will be explained in detail with reference to the accompanying drawings.

In one aspect of the present disclosure, there is provided a method for manufacturing an electrode for an electrochemical device, including the steps of:

(S100) preparing an electrode member which includes a coating layer disposed on the surface of an electrode current collector and including a conductive primer layer and an insulating protective layer; and (S200) disposing a free-standing type dry electrode film on the top surface of the conductive primer layer and carrying out lamination.

First, an electrode member is prepared (S100). The electrode member and method for preparing the same are as follows.

In the electrode member, the coating layer may be disposed on both surfaces or at least one surface of a current collector. FIG. 1 is a schematic view illustrating an electrode member 10*a* having a coating layer disposed on one surface of a current collector, and FIG. 2*a* is a schematic view illustrating an electrode member 10*b* having coating layers 14 disposed on both surfaces of a current collector 13. In addition, the coating layer may be disposed in such a manner that the coating layer may totally or at least partially cover the surface on which it is disposed. According to an embodiment of the present disclosure, the coating layer may be disposed merely at the internal central portion of the current collector surface so that the coated portion may be surrounded with the non-coated portion. In a variant, the coating layer may be disposed merely at the central portion in the width direction of the current collector so that non-coated portions may be disposed at both ends of the coated portion in the width direction.

The coating layer includes a conductive primer layer and an insulating protective layer disposed totally or at least partially in the circumference of the conductive layer with a predetermined width.

According to an embodiment of the present disclosure, the conductive primer layer may be disposed merely at the internal central portion, and the outer circumference of the conductive primer layer may be totally or at least partially surrounded with the insulating protective layer. For example, when the coating layer is disposed merely at the central portion in the width direction of the current collector, the conductive primer layer may be disposed at the central portion of the coating layer in the width direction, and the insulating protective layers may be disposed at both ends of the conductive primer layer in the width direction. FIG. 1 illustrate the electrode member 10*a* according to an embodiment of the present disclosure, wherein a coating layer 14 is disposed at the internal central portion of a current collector 13 based on the width direction thereof, and non-coated portions are disposed at both ends of the coating layer in the width direction. In addition, in the coating layer, a conductive primer layer 11 is disposed at the internal central portion, and insulating protective layers 12 are disposed at both ends of the conductive primer layer in the width direction.

Meanwhile, according to an embodiment of the present disclosure, it is preferred that the insulating protective layer is disposed in the conductive primer layer in such a manner that the lateral surface of the conductive primer layer may not be exposed by virtue of the insulating protective layer. For example, the conductive primer layer and the insulating protective layer may be formed to the same height, or the insulating protective layer may be formed to have a larger thickness.

According to an embodiment of the present disclosure, the conductive primer layer may have a thickness of 0.5-10 μm. Meanwhile, the insulating protective layer may have a thickness of 1-20 μm or 2-20 μm. However, the thickness of each layer is not limited to the above-defined range, and may be controlled suitably considering the electrochemical properties of an electrochemical device to which each element is applied.

In addition, according to an embodiment of the present disclosure, the surface of the conductive primer layer and that of the insulating protective layer (the lateral surfaces) facing each other are preferably in close contact with each other, while not being spaced apart from each other. When a gap is generated between the conductive primer layer and the insulating protective layer, insulation property may be degraded, and the conductive primer layer and/or insulating protective layer may be spaced apart from the current collector, while not being in close contact with the current collector.

The current collector is not particularly limited, as long as it has high conductivity, while not causing any chemical change in the corresponding battery. Particular examples of the current collector include stainless steel, aluminum, nickel, titanium, baked carbon, aluminum or stainless steel surface-treated with carbon, nickel, titanium, silver, or the like. In addition, fine surface irregularities may be formed on the surface of the current collector to enhance the binding force with the positive electrode active material. The current collector may be used in various shapes, including a film, a sheet, a foil, a net, a porous body, a foamed body, a non-woven web, or the like. Meanwhile, according to an embodiment of the present disclosure, the current collector may have a thickness of 10-50 μm, but is not limited thereto. For example, the current collector may have a thickness of 10-20 μm.

The conductive primer layer includes a second conductive material and a second binder resin. According to an embodiment of the present disclosure, the mixture of the second conductive material with the second binder resin may be present in an amount of 90 wt % or more, or 99 wt % or more, based on 100 wt % of the conductive primer layer. The second conductive material may be present in an amount of 20-90 wt %, or 50-90 wt %, based on 100 wt % of the mixture. The second binder resin may be present in an amount of 10-80 wt %, or 10-50 wt %, based on 100 wt % of the conductive primer layer.

The second conductive material is not particularly limited, as long as it has conductivity while not causing any chemical change in the corresponding battery. Particular examples of the conductive material include: graphite, such as natural graphite or artificial graphite; carbon black, such as acetylene black, ketjen black, channel black, furnace black, lamp black or thermal black; conductive fibers, such as carbon fibers or metal fibers; fluorocarbon; metal powder, such as aluminum or nickel powder; conductive whisker, such as zinc oxide or potassium titanate; conductive metal oxide, such as titanium dioxide; conductive material, such as a polyphenylene derivative; or the like. Particularly, the conductive material may include at least one of the above-exemplified materials.

The insulating protective layer may include a third binder resin and inorganic particles. Herein, the mixture of the third binder resin with the inorganic particles may be present in an amount of 90 wt % or more, or 99 wt % or more, based on 100 wt % of the insulating protective layer, and the third binder resin and the inorganic particles may be present at a weight ratio of 10:90-90:10, such as 40:60-60:40. According to the present disclosure, the insulating protective layer may have improved insulation property by virtue of the introduction of the inorganic particles.

There is no particular limitation in the inorganic particles, as long as they are electrochemically stable. In other words, there is no particular limitation in the inorganic particles, as long as they cause no oxidation and/or reduction in the range (e.g. 0-5 V based on Li/Li') of operating voltage of an applicable electrochemical device.

Non-limiting examples of the inorganic particles may include at least selected from the group consisting of AlO(OH), $BaTiO_3$, $Pb(Zr,Ti)O_3$, (PZT), $Pb_{1-x}La_xZr_{1-y}Ti_yO_3$ (PLZT, wherein 0<x<1, 0<y<1), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, $Mg(OH)_2$, NiO, CaO, ZnO, $ZrO_2$, $SiO_2$, $Y_2O_3$, $Al_2O_3$, SiC, $Al(OH)_3$, $TiO_2$, aluminum peroxide, zinc tin hydroxide ($ZnSn(OH)_6$), tin-zinc oxide ($Zn_2SnO_4$, $ZnSnO_3$), antimony trioxide ($Sb_2O_3$), antimony tetroxide ($Sb_2O_4$), antimony pentoxide ($Sb_2O_5$), or the like.

In addition, although there is no particular limitation in the average diameter ($D_{50}$) of the inorganic particles, the inorganic particles preferably have an average diameter of 0.3-1 μm in order to form an insulating protective layer having a uniform thickness and to provide a suitable level of porosity. When the inorganic particles have an average diameter of less than 0.3 μm, the dispersibility of the inorganic particles in the prepared slurry may be degraded. When the inorganic particles have an average diameter of larger than 1 μm, the resultant insulating protective layer may have an increased thickness.

According to an embodiment of the present disclosure, each of the second binder resin and the third binder resin may include at least one selected from polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene monomer (EPDM) terpolymer, sulfonated EPDM, styrene-butadiene rubber, fluoro-rubber, various copolymers, or the like. However, each binder is not limited thereto, and any binder resin applicable to an electrochemical device may be selected and used suitably.

The electrode member may be prepared as follows.

A coating layer is formed by preparing the first slurry for forming a conductive primer layer and the second slurry for forming an insulating protective layer, coating them on a current collector, followed by drying.

Herein, the first slurry and the second slurry may be applied at the same time and introduced to a drying step at the same time to form a coating layer (Process A). In a variant, when the first slurry and the second slurry are applied sequentially, the first slurry and the second slurry may be introduced to a drying step at the same time after both of them are applied to form a coating layer (Process B), or the first slurry may be applied and dried to form a conductive primer layer, and then the second slurry may be applied and dried to form an insulating protective layer, thereby forming a coating layer (Process C).

Meanwhile, in the case of Process A or Process B, the first slurry and the second slurry are in contact with each other, while being in a flowable state, and form a mixed layer at the boundary surface, thereby providing a structure in which the insulating protective layer and the conductive primer layer are integrated. According to the present disclosure, it is preferred that the conductive primer layer and the insulating protective layer are in close contact with each other at the surfaces (lateral surfaces) facing each other, while not being spaced apart from each other. In this contest, Process A or Process B may be used advantageously when forming a coating layer.

The first slurry may be prepared by introducing the second conductive material and the second binder resin simultaneously or sequentially to a solvent, followed by mixing.

In addition, the second slurry may be prepared by introducing the third binder resin to a solvent, followed by mixing.

It is advantageous that the solvent used independently in each of the first slurry and the second slurry is a solvent having a low boiling point and high volatility to be dried rapidly. Particular examples of the solvent may include, but are not limited to: water, acetone, N-methyl-2-pyrrolidone, tetrahydrofuran, methylene chloride, chloroform, dimethylformamide, cyclohexane, or the like.

Each of the first slurry and the second slurry may be applied by using a process selected suitably from the known processes, such as slot die coating, doctor blade, gravure coating, inkjet printing, spray coating, transfer, or the like, but is not limited thereto. Each of the first slurry and the second slurry may be dried by using a process selected suitably from the known drying processes, such as natural drying, air blowing drying, thermal drying, or the like, but is not limited thereto.

Next, a free-standing type dry electrode film is disposed on the top surface of the conductive primer layer of the prepared electrode member, and lamination is carried out to obtain a dry electrode (S200).

According to the present disclosure, the free-standing type dry electrode film is formed by calendering an electrode powder including an electrode active material, a first conductive material and a first binder resin to form a strip- or sheet-like shape having a predetermined thickness.

According to an embodiment of the present disclosure, the electrode powder may be obtained by the method as described hereinafter.

The method for preparing electrode powder includes the steps of:

(a) a first step of preparing a powdery mixture including an electrode active material, a first conductive material and a first binder resin;

(b) a second step of kneading the powdery mixture at 70-200° C. to prepare mixture lumps; and (c) a third step of pulverizing the mixture lumps.

Hereinafter, each of the first to the third steps will be explained in more detail.

First, a mixture including an electrode active material, a first conductive material and a first binder is prepared (the first step).

Herein, the mixing for preparing the mixture is carried out in such a manner that the electrode active material, the first conductive material and the first binder resin may be distributed homogeneously. In addition, since the mixture is mixed in the form of powder, any mixing process capable of simple mixing of the ingredients may be used with no particular limitation, and the ingredients may be mixed through various processes. However, since the electrode is manufactured as a dry electrode using no solvent according to the present disclosure, the mixing may be carried out through a dry mixing process, and the ingredients may be introduced to an instrument, such as a blender, to carry out the mixing. According to an embodiment of the present disclosure, the mixing time may be controlled suitably within a range of 30 seconds to 10 minutes. In addition, the mixing speed may be controlled suitably within a range of about 500-30,000 rpm. However, the mixing speed and time are not limited to the above-defined ranges.

According to the present disclosure, the first binder resin is not particularly limited, as long as it can be fibrilized by the first step and/or the second step. The term 'fibrilization' refers to finely dividing a polymer, and may be carried out by using mechanical force, or the like. The fibrilized polymer fibers are disintegrated on their surfaces to generate a plurality of microfibers (fibrils). Non-limiting examples of the binder resin may include polytetrafluoroethylene (PTFE), polyolefin or a mixture thereof.

According to an embodiment of the present disclosure, the electrode active material may be a positive electrode active material.

The positive electrode active material is not particularly limited, as long as it can be used as a positive electrode material for an electrochemical device, and non-limiting examples thereof may include any one selected from lithium transition metal oxides, lithium metal iron phosphorus oxides and metal oxides. Particular examples of the positive electrode active material include at least one selected from: layered compounds, such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.9), such as $Li(Ni_x, Mn_y, Co_z)O_2$ (wherein x+y+z=1, and each of x, y and z is larger than 0) and/or $Li(Ni_x, Mn_y, Co_t, Al_w)O_2$ (wherein x+y+z+w=1, and each of x, y, z and w is larger than 0); lithium manganese composite oxides represented by the chemical formula of $LiMn_{2-x}M_xO_2$ (wherein M is Co, Ni, Fe, Cr, Zn or Ta, and x is 0.01-0.1) or $Li_2Mn_3MO_8$ (wherein M is Fe, Co, Ni, Cu or Zn); $LiMn_2O_4$ in which Li is partially substituted with an alkaline earth metal ion; lithium metal phosphorous oxides $LiMPO_4$ (wherein M is Fe, Co, Ni or Mn); disulfide compounds; and $Fe_2(MoO_4)_3$; or the like. However, the scope of the present disclosure is not limited thereto.

In a variant, the electrode active material may be a negative electrode active material. Particular examples of the negative electrode active material include: carbon such as non-graphitizable carbon or graphite-based carbon; metal composite oxides, such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb, Ge; Me': Al, B, P, Si, elements of Group 1, 2 or 3 in the Periodic Table, halogen; $0<x \leq 1$; $1 \leq y \leq 3$; $1 \leq z \leq 8$); lithium metal; lithium alloy; silicon-based alloy; tin-based alloy; silicon oxides, such as SiO, SiO/C and $SiO_2$; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; or the like.

The first conductive material is not particularly limited, as long as it has conductivity while not causing any chemical change in the corresponding battery. Particular examples of the conductive material include: graphite, such as natural graphite or artificial graphite; carbon black, such as acetylene black, ketjen black, channel black, furnace black, lamp black or thermal black; conductive fibers, such as carbon fibers or metal fibers; fluorocarbon; metal powder, such as aluminum or nickel powder; conductive whisker, such as zinc oxide or potassium titanate; conductive metal oxide, such as titanium dioxide; conductive material, such as a polyphenylene derivative; or the like. Particularly, the conductive material may include at least one selected from the group consisting of activated carbon, graphite, carbon black and carbon nanotubes, and more particularly, activated carbon, with a view to homogeneous mixing of the conductive material and improvement of conductivity.

The mixing ratio of the electrode active material, the first conductive material and the first binder may be 80-98 wt %:0.5-10 wt %:0.5-10 wt % (active material:conductive material:binder), particularly, 85-98 wt %:0.5-5 wt %:0.5-10 wt %.

Next, the mixture obtained from the first step is subjected to a processing kneading step to fibrilize the binder resin (the second step).

The kneading is not limited to a particular process. According to an embodiment of the present disclosure, the kneading may be carried out through a kneader, or the like. The kneading step is a step of binding or connecting the active material and conductive material powder particles, while the binder is fibrilized, thereby forming mixture lumps having a solid content of 100%. According to an embodiment of the present disclosure, the kneading may be controlled to a kneading speed of 10-100 rpm, a kneading time of 1-30 minutes, and a shear rate of 10/s to 500/s. Meanwhile, the kneading step may be carried out at high temperature under a pressure condition of ambient pressure or higher, particularly, a pressure condition higher than ambient pressure.

Then, the mixture lumps are further pulverized to obtain an electrode powder (the third step). For example, the pulverization may be carried out by using an instrument, such as a blender or a grinder. According to an embodiment, the powder may have a particle diameter of 0.1-3 mm. Herein, the pulverization is not particularly limited, but may be carried out by using a known pulverization instrument, such as a blender or a grinder. According to an embodiment of the present disclosure, the pulverization may be controlled to a speed of 100-30,000 rpm. Meanwhile, the pulverization time may be controlled suitably within a range of 10 seconds to 10 minutes. However, the pulverization speed and time are not limited to the above-defined ranges.

In this manner, an electrode powder is obtained, and then the electrode powder is pressed under heating to provide a free-standing type dry electrode film. The electrode powder is pressed under heating through a calendering process to be processed into a strip- or sheet-like dry electrode film. The calendering process may be carried out by using a pair of calendering rollers facing each other. According to an embodiment of the present disclosure, the calendering process may be carried out by passing the electrode powder through a plurality of calendering rollers.

Figure 3A:
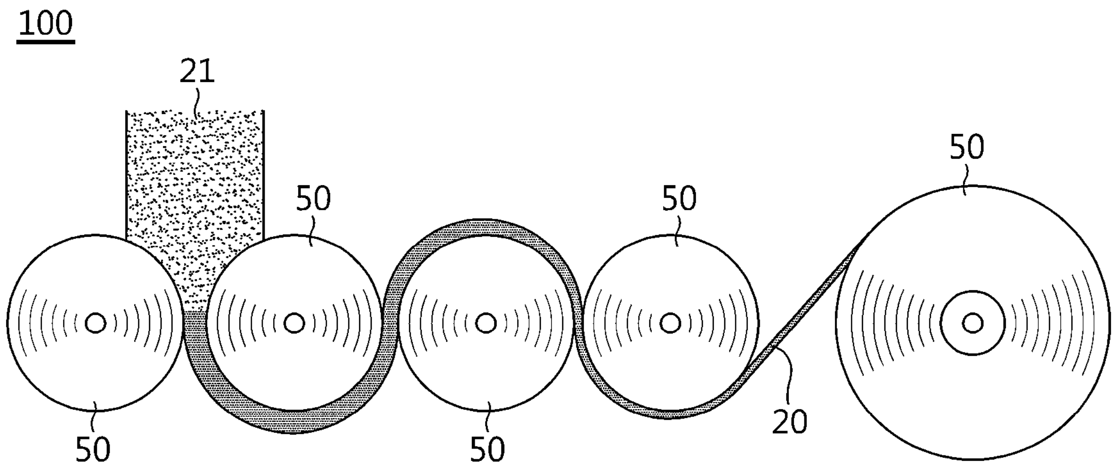
FIG. 3*a* and FIG. 3*b* are schematic views illustrating the method for manufacturing a dry electrode according to an embodiment of the present disclosure, wherein an electrode powder is introduced to a calendering process to obtain a free-standing type dry electrode film.
Figure 3B:
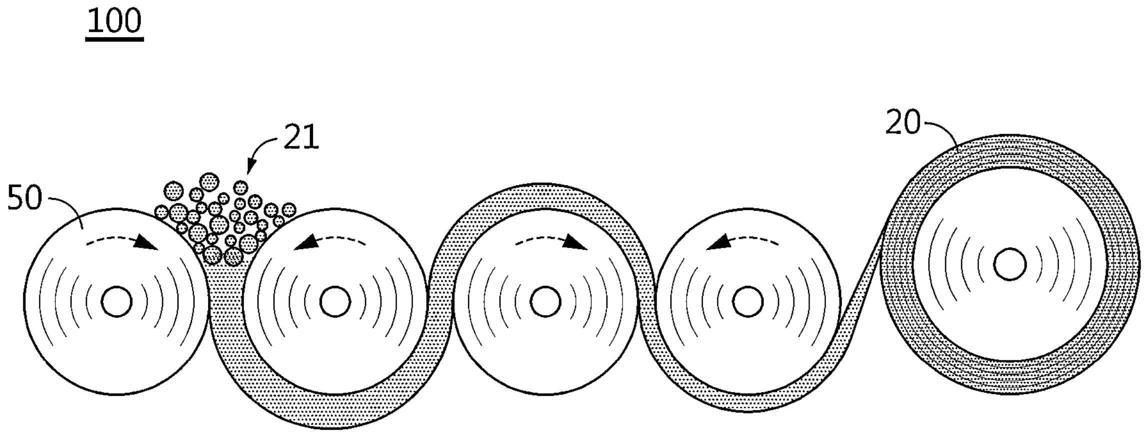

FIG. 3*a* and FIG. 3*b* are schematic views illustrating the method for manufacturing an electrode film according to an embodiment of the present disclosure, particularly the calendering process. Referring to FIG. 3*a*, the calendering process 100 may be carried out by a calendering processing system including a plurality of calender rollers disposed therein. Herein, the electrode powder 21 prepared through the pretreatment is passed through a calender roll 50 first to be molded into a sheet-like dry electrode film member, and then the member is passed through the calender roll at least twice or more times to control the thickness and density. In this manner, a dry electrode film 20 may be obtained. The obtained dry electrode film may be stored, before it is provided to manufacture an electrode, or it is introduced to the manufacture of an electrode after winding.

Meanwhile, in a variant, roll pressing units having two calendering rolls 50 facing each other may be disposed, while being spaced apart from each other by a predetermined interval. FIG. 3*b* is a schematic view illustrating the calendering process 100 according to another embodiment of the present disclosure. Referring to FIG. 3*b*, the electrode powder 21 is pressed many times by a calendering system in which roll pressing units having two calendering rolls 50 facing each other are disposed, while being spaced apart from each other by a predetermined interval, thereby providing a dry electrode film 20. Meanwhile, the electrode powder may be further subjected to a pretreatment step of heating the electrode powder to a temperature of 100° C. or higher, before it is introduced to the calendering step. When the pretreatment step is carried out, the binder resin contained in the electrode powder may have increased softness. In addition, since the degree of orientation of the binder fibrilized in the calendering step in the direction (machine direction, MD) of process progress is increased, it is possible to form an electrode film under a relatively lower pressure condition in the subsequent calendering step, as compared to the electrode powder not subjected to the pretreatment step. Therefore, it is possible to reduce generation of defects in appearance and to improve the processability, when manufacturing the electrode film.

According to an embodiment of the present disclosure, the dry electrode film may have a thickness of 50-300 μm. However, the thickness is not limited to the above-defined range, and may be controlled in a suitable range considering the electrochemical properties of a battery to which the dry electrode film is applied.

According to an embodiment of the present disclosure, the dry electrode film may have a porosity of 20-50 vol %. Within the above-defined range, the porosity may be controlled to 40 vol % or less, or 35 vol % or less, preferably. When the porosity satisfies the above-defined range, there are provided various advantages. On the other hand, when the porosity is excessively low beyond the above-defined range, it is difficult to wet the dry electrode film with an electrolyte, which is not preferred in terms of life and output characteristics. When the porosity is excessively high, the volume of the dry electrode film required for realizing the same capacity is increased, which is not preferred in terms of energy density per unit volume. According to an embodiment of the present disclosure, the porosity may be calculated from the following Mathematical Formula 1 by using the actual density calculated based on the actual density and composition of each ingredient, after measuring the apparent density of the dry electrode film:

$$\text{Porosity (\%)}=\{1-(\text{Apparent density}/\text{Actual density})\}\times 100 \qquad \text{[Mathematical Formula 1]}$$

Figure 4:
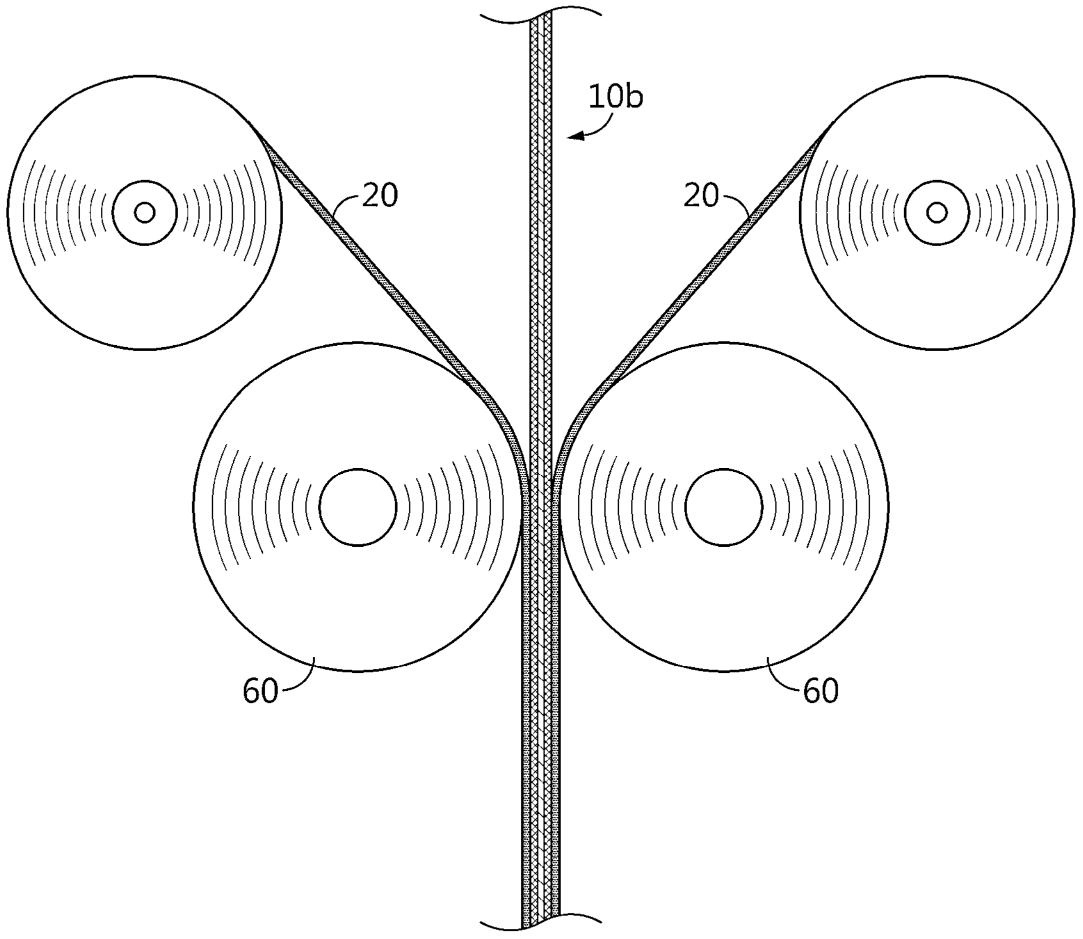
FIG. 4 and FIG. 5 are schematic views illustrating the method for manufacturing a dry electrode according to an embodiment of the present disclosure, wherein an electrode member, having an insulation coating layer and a conductive primer layer formed on the surface of a current collector, and a free-standing type electrode film are laminated through a roll-to-roll continuous process to obtain a dry electrode.
Figure 5:
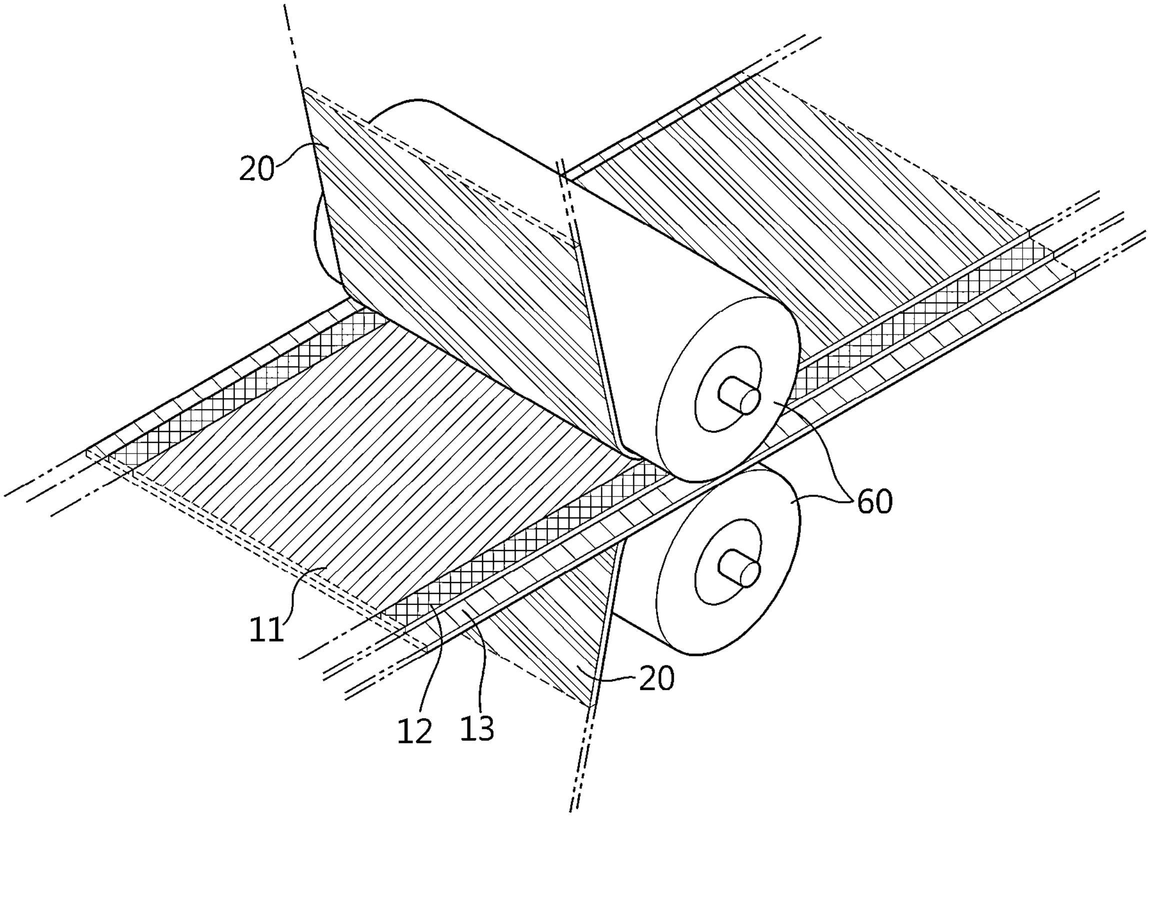

After that, the resultant dry electrode film is disposed on the top of the coating layer, preferably on the top of the conductive primer layer, and a lamination step is carried out through thermal compression. It is possible to obtain an electrode for an electrochemical device through the lamination step. For example, the lamination step may be carried out by disposing the electrode member and the dry electrode film between a pair of jigs facing each other and pressurizing them, or by passing the electrode member and the dry electrode film through a pair of lamination rolls so that they may be compressed. Herein, the jig or lamination roll may be heated to a temperature of 20-250° C. so that the electrode member and the electrode film may be thermally compressed. FIG. 4 and FIG. 5 are schematic views illustrating a method for manufacturing an electrode by laminating an electrode member 10*b* and a dry electrode film 20. Referring to FIG. 4 and FIG. 5, dry electrode films are disposed on both surfaces of the electrode member and are compressed through a pair of lamination rolls 60, thereby providing a dry electrode. Referring to FIG. 4 and FIG. 5, the dry electrode films are disposed on both surfaces of the electrode member, and a pair of lamination rolls 60 is used to carry out compression, thereby providing a dry electrode. Referring to FIG. 5, the dry electrode film is disposed on the top of the conductive primer layer, and the insulating protective layer of the coating layer is exposed totally or partially in the finished dry electrode.

According to the present disclosure, the electrode includes the dry electrode film disposed on the surface of the coating layer. According to an embodiment of the present disclosure, the dry electrode film may be disposed on the top of the conductive primer layer in such a manner that the top surface of the conductive primer layer may be covered at least partially or totally with the dry electrode film. For example, the dry electrode film may be disposed in such a manner that the top surface of the conductive primer layer may not be exposed and may not be overlapped with the insulating protective layer. For example, the dry electrode film is predetermined to have a shape and dimension corresponding to the conductive primer layer, and is formed in such a manner that the dry electrode film may totally cover the top surface of the conductive primer layer with the proviso that it is not overlapped with the top surface of the insulation coating layer or the top surface of the insulation coating layer is at least partially exposed.

In other words, the electrode according to the present disclosure is a dry electrode obtained by the above-described method for manufacturing a dry electrode, the electrode includes an electrode current collector, a conductive primer layer, an insulating protective layer and an electrode active material layer, wherein the conductive primer layer is disposed at least partially on both surfaces or one surface of the electrode current collector to a predetermined thickness, and the insulating protective layer is disposed in the whole or at least a partial region of the outer circumference of the lateral surface of the conductive primer layer. In addition, the electrode active material layer includes a free-standing type dry electrode film, and may be disposed in such a manner that the top surface of the conductive primer layer may not be exposed. Further, the electrode active material layer in the electrode is disposed in such a manner that it may be partially overlapped with the insulating protective layer or may not be overlapped therewith, and the insulating protective layer is disposed in the conductive primer layer in such a manner that the lateral surface of the conductive primer layer may not be exposed by virtue of the insulating protective layer.

Figure 6:
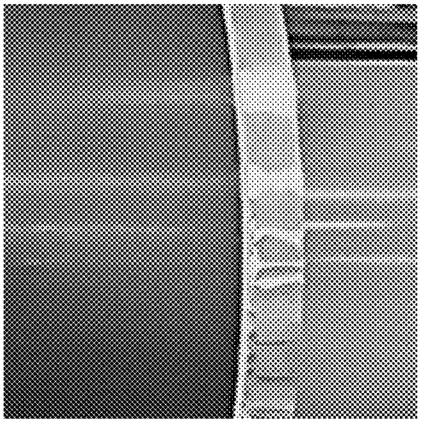
FIG. 6 is a photographic image illustrating the dry electrode obtained by the method for manufacturing a dry electrode according to an embodiment of the present disclosure.
Figure 7:
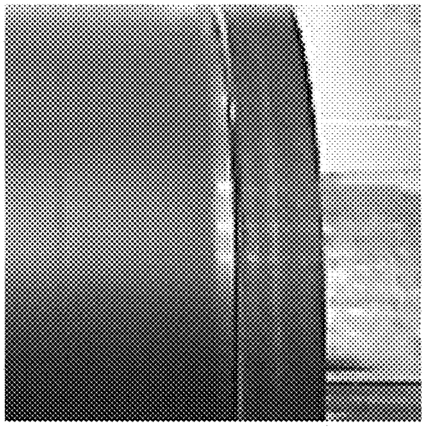
FIG. 7 is a photographic image illustrating the dry electrode obtained by the method for manufacturing a dry electrode according to Comparative Example.

FIG. 6 is a photographic image of the dry electrode obtained by the method for manufacturing a dry electrode according to an embodiment of the present disclosure, and FIG. 7 is a photographic image illustrating the dry electrode obtained by the method for manufacturing a dry electrode according to Comparative Example. Referring to FIG. 6, it can be seen that the insulation coating layer is disposed on the current collector before the electrode active material layer to allow the conductive primer layer to be in close contact with the insulation coating layer with no gap, and the insulation coating layer is not overlapped with the top surface of the electrode active material layer, thereby forming no protrusion resulting from the overlapping with the insulation coating layer at the end of the electrode active material layer. Meanwhile, when the insulation coating layer is disposed after the electrode active material layer according to Comparative Example, it is difficult to allow the insulation coating layer to be in close contact with the conductive primer layer with no gap, while avoiding the overlapping of the conductive primer layer with the electrode active material layer. Particularly, the insulation coating layer partially covers the surface of the electrode active material layer, and thus the thickness of the electrode is increased by the thickness of the insulation coating layer. In addition, the protrusion formed at the end of the electrode active material layer due to the overlapping with the insulation coating layer may cause a rupture of the electrode active material layer during the pressing step that may be performed subsequently in the manufacture of a battery. Further, the surface of the electrode active material layer may not be in close contact with a separator but may be spaced apart from the separator.

In another aspect of the present disclosure, there is provided a secondary battery which includes the dry electrode, wherein the dry electrode is a positive electrode, and an electrode assembly including the positive electrode, a negative electrode and a separator is received in a battery casing together with a lithium-containing non-aqueous electrolyte. There is also provided an energy storage system which includes the secondary battery as a unit cell.

The present disclosure has been described in detail with reference to various embodiments and drawings. However, it should be understood that the embodiments defined by detailed description and drawings indicate specific examples of the disclosure, given by way of illustration only, to help those skilled in the art to understand the present disclosure with ease, and the scope of the present disclosure is not limited thereto.

MODE FOR DISCLOSURE

FIG. 6 is a photographic image of the dry electrode obtained by the method for manufacturing a dry electrode according to an embodiment of the present disclosure, and FIG. 7 is a photographic image illustrating the dry electrode obtained by the method for manufacturing a dry electrode according to Comparative Example.

Hereinafter, the present disclosure will be explained in detail with reference to Examples, Comparative Examples and Test Examples so that the present disclosure will fully convey the scope of the present disclosure to those skilled in the art.

Example

Manufacture of Dry Electrode Film

First, 96 wt % of a lithium nickel cobalt manganese aluminum compound, 1 wt % of carbon black as a conductive material and 3 wt % of polytetrafluoroethylene (PTFE) as a binder were introduced to a blender and mixed under 10,000 rpm for 1 minute to obtain a mixture. Next, the resultant mixture was introduced to a kneader and kneaded at 150° C. under 50 rpm for 5 minutes to obtain mixture lumps, and then the mixture lumps were introduced to a blender and pulverized under 10,000 rpm for 40 seconds to obtain an electrode powder. Then, the electrode powder was compressed repeatedly by using a calender roll (roll diameter: 200 mm, roll temperature: 100° C.) to obtain a dry electrode film (thickness 82 μm). Meanwhile, the loading amount of the electrode active material in the resultant dry electrode film was 5.11 $mAh/cm^2$.

Manufacture of Electrode

Aluminum foil (thickness 15 μm) for a current collector was prepared. A conductive primer layer was coated to a thickness of 0.5 μm on the surface of the current collector along the longitudinal direction of the current collector, an insulating protective layer having a width of about 1.5 mm was coated on each of both ends of the conductive primer layer in the width direction. The coating width of the conductive primer layer was set to be the same as the width of the dry electrode film. The insulating protective layer had a thickness of about 1 μm. The conductive primer layer includes carbon black and polyvinylidene fluoride (PVDF) at a weight ratio of 1:2, and the insulating protective layer includes boehmite and styrene butadiene rubber at a weight ratio of 40:60.

Then, the dry electrode film was disposed on the top surface of the conductive primer layer, and lamination was carried out to obtain a dry electrode.

As described above, the dry electrode according to Example was obtained by forming the insulating protective layer first, before the step of lamination of the coating layer with the dry electrode film, and then carrying out lamination of the dry electrode film with the coating layer.

As shown in FIG. 6, it can be seen that since the insulating protective layer is formed at both ends of the current collector before disposing the electrode active material layer, no gap is generated between the protective layer and the conductive primer layer, and no protrusion is formed at the end of the electrode.

Comparative Example

A dry electrode film was obtained in the same manner as Example.

Aluminum foil (thickness 15 μm) for a current collector was prepared. A conductive primer layer was coated to a thickness of 0.5 μm with the same width as the dry electrode film on the surface of the current collector along the longitudinal direction of the current collector. The conductive primer layer includes carbon black and polyvinylidene fluoride (PVDF) at a weight ratio of 1:2. Next, the dry electrode film was disposed on the top surface of the conductive primer layer, and lamination was carried out so that the dry electrode film might be bound with the current collector. Then, an insulating protective layer having a width of about 1.5 mm was coated on each of both ends of the conductive primer layer in the width direction. The insulating protective layer includes boehmite and styrene butadiene rubber at a weight ratio of 40:60 and has a thickness of 1 μm. As shown in FIG. 7 it can be seen that since the insulation layers (white colored) are formed at both ends of the current collector after forming the electrode active material layer, the insulation layers are overlapped with the electrode active material layer to form a protrusion at the end of the electrode active material layer (particularly, at the right side of the drawing).

DESCRIPTION OF DRAWING NUMERALS

10*a*, 10*b*: Electrode member
11: Conductive primer layer
12: Insulating protective layer
13: Current collector
14: Coating layer
20: Dry electrode film
21: Electrode powder
50: Calender roll
60: Lamination roll

What is claimed is:

1. A method for manufacturing an electrode for an electrochemical device, comprising:
- (S100) preparing an electrode member by applying a coating layer on a surface of an electrode current collector, wherein the applying of the coating layer includes:
- applying a conductive primer layer and applying an insulating protective layer; and
- (S200) disposing a free-standing dry electrode film on a top surface of the conductive primer layer and carrying out lamination,
- wherein the insulating protective layer is disposed in such a manner that a lateral surface of the conductive primer layer is not exposed by virtue of the insulating protective layer, and
- the dry electrode film is disposed on the top of the conductive primer layer in such a manner that the dry electrode film at least partially or totally cover the top surface of the conductive primer layer, and
- wherein the insulating protective layer is applied before the disposing of the free-standing dry electrode film.

2. The method of claim 1, wherein the coating layer is disposed on both surfaces or at least one surface of the current collector, and
- the coating layer is disposed in such a manner that the coating layer totally or at least partially cover the surface on which the coating layer is disposed.

3. The method of claim 1, wherein the conductive primer layer and the insulating protective layer are formed to a same height, or the insulating protective layer has a taller height than the conductive primer layer.

4. The method of claim 1, wherein the conductive primer layer comprises a second conductive material and a second binder resin.

5. The method of claim 1, wherein the insulating protective layer comprises a third binder resin and inorganic particles.

6. The method of claim 5, wherein the third binder resin and the inorganic particles are present at a ratio of 10:90-40:60.

7. The method of claim 1, wherein the conductive primer layer and the insulating protective layer are disposed in such a manner that their lateral surfaces are in contact with each other with no gap.

8. The method of claim 1, wherein the free-standing dry electrode film is formed by calendering an electrode powder comprising an electrode active material, a first conductive material and a first binder resin to form a strip- or sheet-like shape having a predetermined thickness.

9. The method of claim 8, wherein the electrode powder is prepared by:
- (a) preparing a powdery mixture comprising the electrode active material, the first conductive material and the first binder resin;
- (b) kneading the powdery mixture at 70-200° C. to prepare mixture lumps; and
- (c) pulverizing the mixture lumps.

10. The method of claim 9, wherein the electrode powder is heated to a predetermined temperature, before it is introduced to the calendering.

11. The method of claim 8, wherein the first binder resin comprises polytetrafluoroethylene (PTFE), polyolefin or a mixture thereof.

12. An electrode for an electrochemical device, which is obtained by the method of claim 1, and comprises an electrode current collector, a conductive primer layer, an insulating protective layer and an electrode active material layer,
- wherein the conductive primer layer is disposed in such a manner that it has a predetermined thickness at least partially on both surfaces or one surface of the electrode current collector, and the insulating protective layer is disposed totally or at least partially in the outer circumference of the lateral surface of the conductive primer layer,
- the electrode active material layer comprises a free-standing dry electrode film,
- the electrode active material layer is disposed on the top of the conductive primer layer, and the insulating protective layer is disposed in such a manner that a lateral surface of the conductive primer layer is not be exposed by virtue of the insulating protective layer.

13. The electrode for an electrochemical device according to claim 12, wherein the free-standing dry electrode film is formed by calendering an electrode powder comprising an electrode active material, a first conductive material and a first binder resin to form a strip- or sheet-like shape having a predetermined thickness.

14. A secondary battery comprising an electrode assembly comprising the electrode of claim 12, wherein the electrode is a positive electrode, and the electrode assembly further comprises a negative electrode and a separator, wherein the electrode assembly is received in a battery casing together with a lithium-containing non-aqueous electrolyte.

15. An energy storage system which comprises the secondary battery of claim 14 as a unit cell.

* * * * *